Inventors
HARRY GEORGE LETCH &
LEONALD CYRIL POWELL

Inventors
HARRY GEORGE LETCH &
LEONALD CYRIL POWELL

United States Patent Office 3,433,966
Patented Mar. 18, 1969

3,433,966
ALARM SYSTEM FOR DETECTING FALLEN BOTTLES ON A CONVEYOR
Harry George Letch and Leonard Cyril Powell, London, Ontario, Canada, assignors to John Labbatt Limited, London, Ontario, Canada, a company of Canada
Continuation-in-part of application Ser. No. 490,309, Sept. 27, 1965. This application Jan. 3, 1968, Ser. No. 703,204
Claims priority, application Canada, Jan. 11, 1967, 936,015
U.S. Cl. 250—223                                               6 Claims
Int. Cl. H01j *39/12;* G06m *7/00*

ABSTRACT OF THE DISCLOSURE

An alarm system for detecting fallen bottles on a conveyor for carrying bottles in a vertical position, in which depending hinge members are pivotally attached to a transverse axis above the bottles. A separate hinge member is provided for each longitudinal row of bottles and each hinge member has a feeler arm which rides along the mouth of the bottles and is arranged such that the feeler arm swings downwardly when it passes over a fallen bottle and actuates a switch in an electrical circuit.

Background of the invention

This invention relates to an alarm system for detecting fallen bottles on a conveyor for carrying bottles in vertical position and is a continuation-in-part of application Ser. No. 490,309 filed Sept. 27, 1965, now abandoned.

Bottles, either empty or full, when carried through a conveyor system is a vertical position, will occasionally fall over into a horizontal position at transfer points from one conveyor leg to another. If allowed to continue, such fallen bottles will cause jams at the next transfer point, leading to lost efficiency of the conveyor system.

Generally a man must be stationed to maintain a continuous watch on such a conveyor in order to detect any fallen bottles. Not only is this a most tedious task but also a waste of manpower.

Summary of the invention

According to this invention the necessity of a man to continuously supervise the movement of upright bottles on a conveyor is eliminated by providing a mechanical feeler arm which slides along the tops of vertical bottles and detects any fallen bottles. The feeler arm consists of a hinge member which is pivotally attached to a transverse horizontal axis positioned above the bottles on the conveyor.

The hinge member includes a flat feeler portion which is intended to run along the tops of a row of upright bottles being carried forward on the conveyor. By arranging the feeler portion to be slightly longer than the distance between the bottle tops in a row, the feeler will be supported by the bottle tops as long as all bottles are upright. However, when a bottle falls, a large space is created in the row of bottles and the feeler portion swings downwardly causing the hinge member to pivot about the axis. A hinge member is provided for each row of bottles being carried on the conveyor.

Each hinge member is arranged such that when a feeler arm swings downwardly over a fallen bottle it actuates a switch which either actuates an alarm or an auxiliary device for righting the fallen bottls.

Description of preferred embodiments

According to one embodiment of the invention, a light source is provided at one side of the conveyor in a position above the transverse axis. This light source is focussed on a photoelectric cell on the opposite side of the conveyor such that the light beam from the light source to the photoelectric cell is parallel with the transverse axis.

The light beam and hinge member are arranged such that a portion of the hinge member will interrupt the light beam when the feeler arm pivots downwardly over a fallen bottle. This interruption of the light beam causes the photoelectric cell to actuate the switch.

According to another embodiment, each depending hinge member is connected to an electrical power source and an electrical contact is provided in association with each hinge member and connected to the same power source. The contact and associated hinge member are arranged such that the hings member contacts the electrical contact and completes the circuit when the feeler arm of the hinge member pivots downwardly to pass over a fallen bottle.

This invention will now be illustrated by the following drawings in which.

Figure 1:
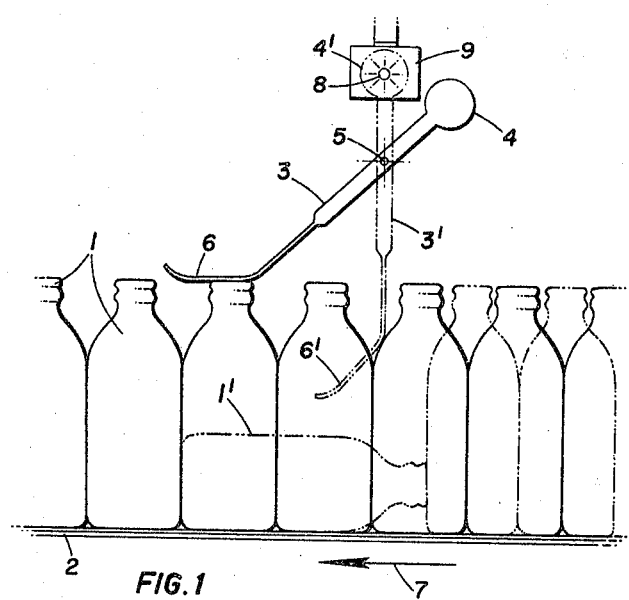
FIGURE 1 is a schematic front elevation of an embodiment of the device of the invention.
Figure 2:
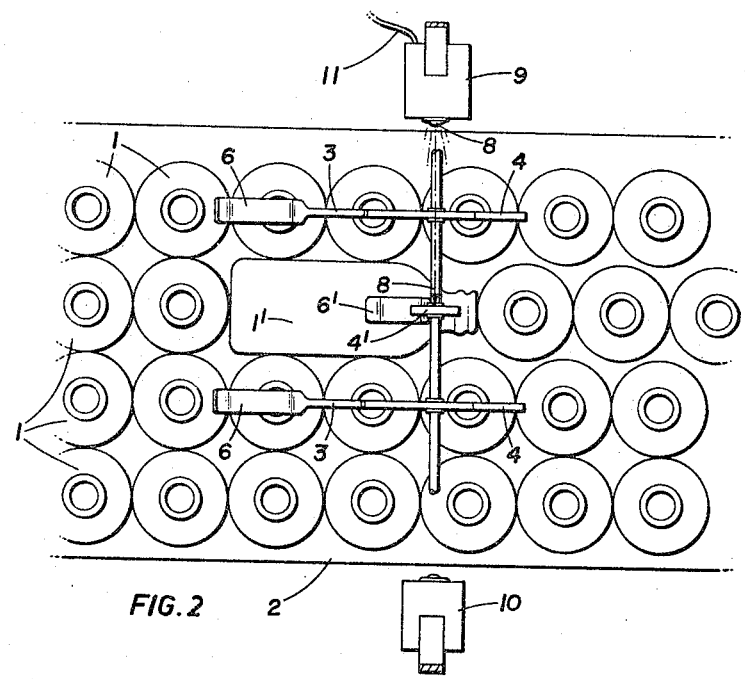
FIGURE 2 is a plan view of the device as shown in FIGURE 1.

As shown in FIGURES 1 and 2, a series of bottles 1 travel on the conveyor 2 in the direction of the arrow 7. Positioned above the bottles on the conveyor is a hinge member 3 pivoted on an axis 5. The hinge member 3 includes a flat feeler portion 6 which rides along the tops of the bottles and is positioned below the pivot 5 and also an upper portion 4 above the pivot 5.

As shown in FIGURE 2, the light source 10 is arranged at one side of the conveyor and directs a light beam 8 to a photoelectric cell 9 on the opposite side of the conveyor. A line 11 connects the photoelectric cell to either an alarm system or a device for righting fallen bottles. The position of the light beam is also shown by the numeral 8 in FIGURE 1.

When the bottles 1 are all in an upright position as shown by the solid lines in FIGURE 1, the hinge member 3 remains in the position as shown by the solid lines so that the feeler 6 rides along the tops of the bottles and the upper portion 4 of the hinge member is out of alignment with the light beam 8. However, when the conveyor is carrying a fallen bottle 1' (shown by broken lines) the hinge member 3 pivots about axis 5 to assume position 3' shown in broken lines. The feeler portion 6 swings downwardly to the position 6' while the upper portion 4 swings up into position 4' where it interrupts the light beam 8. This interruption of the light beam to the photoelectric cell 10 causes the photoelectric cell to actuate either an alarm system or a device for righting the fallen bottle.

Although the drawings show the portion of the hinge member above the pivot point interrupting the light beam, it will be understood that the invention can also include an arrangement wherein the portion of the hinge member below the pivot interrupts the light beam.

Figure 3:
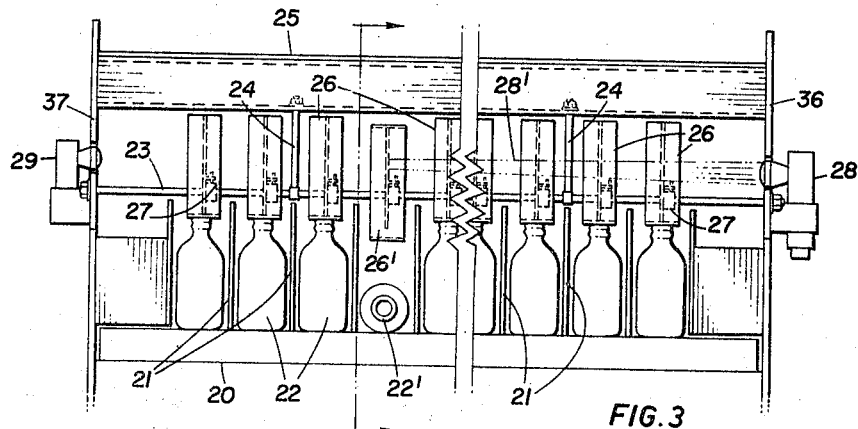
FIGURE 3 is a front elevation of a commercial embodiment of the device.
Figure 4:
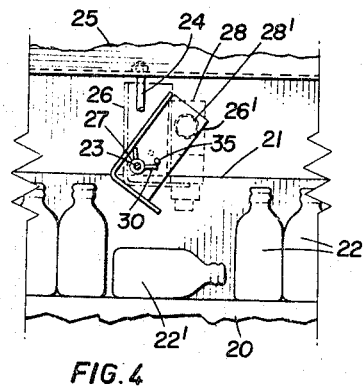
FIGURE 4 is a section through the line 4—4 in FIGURE 3.

In the commercial device as shown in FIGURES 3 and 4 a conveyor table 20 is arranged for carrying rows of bottles 22 between dividers 21. A rod 23 is fixed in a position above the bottles, being supported at the side 36 and 37 of the conveyor and also by hangers 24 from a cat-walk 25 above the conveyor The cat-walk becomes necessary for servicing a commercial device since the conveyor may be, for example, twelve feet wide and there may be, for example, as many as forty rows of bottles on a single conveyor.

Hinge members 26 are pivotally connected to rod 23 and are held in position on the rod by spacers 27. The hinge member 26' is shown swung down into the position when a fallen bottle 22' is detected.

A light unit 28 is fixed to one side 36 of the conveyor and is focused on a photoelectric cell 29 fixed on the opposite side 37 of the conveyor such that the light beam 28' between the light source and the photoelectric cell is broken by a hinge member only when the hinge member assumes the position 26'.

Figure 5:
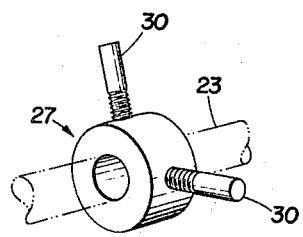
FIGURE 5 is a perspective view of a spacer for the hinge member.

The spacer 27 is shown in greater detail in FIGURE 5, from which it will be seen that each spacer is an annular ring fixed in position on the rod 23 by means of set screws 30. The set screws 30 project outwardly from the face of the spacer 27 and these projections engage the hinge members 26 to control the angle through which they are permitted to pivot.

Figure 6:
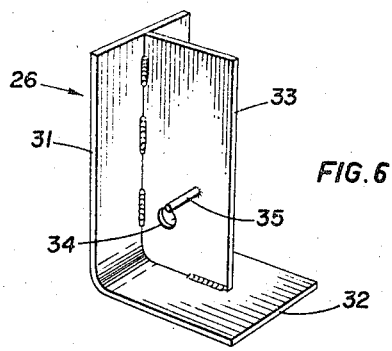
FIGURE 6 is a perspective view of the hinge member utilized in the embodiment of FIGURE 3.

FIGURE 6 shows a hinge member 26 in greater detail and it will be seen that it consists of two flat flange portions 31 and 32 bent at right angles to each other and a thin rectangular web 33 welded perpendicular to the flanges 31 and 32. The web 33 contains a hole 34 for mounting on the rod 23 and also a projecting pin 35, which pin is adapted to engage the projecting set screws 30 in the spacers 27. The set screws 30 and the pins 35 are positioned so that the hinge members 26 may only pivot through a predetermined angle and so that the hinge members 26 will interrupt the light beam as long as there is a fallen bottle beneath the feeler portion of the hinge member.

Figure 7:
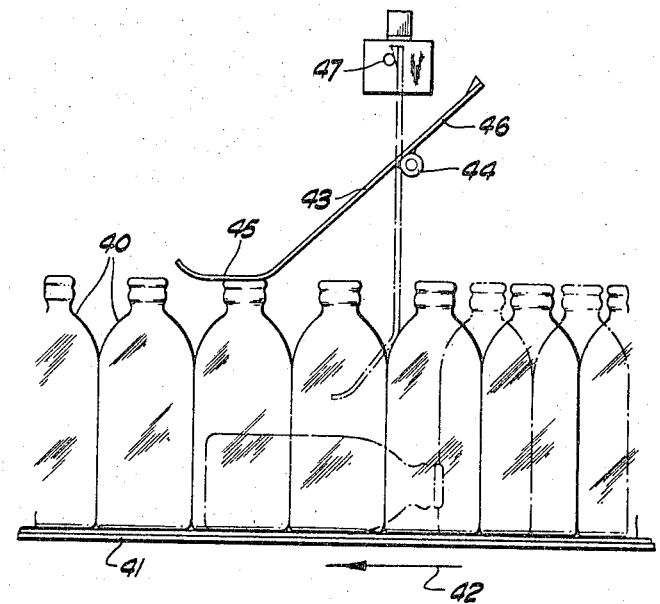
FIGURE 7 is a side elevation of another embodiment of the invention.
Figure 8:
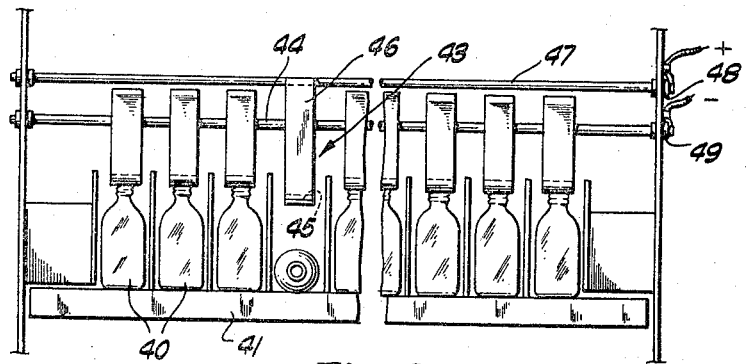
FIGURE 8 is an end elevation of the embodiment of FIGURE 7.

As shown in FIGURE 7, a series of bottles 40 travel in longitudinal rows on a conveyor 41 in the direction of arrow 42. Positioned above the bottles on the conveyor are a series of hinge members 43 pivoted on an axis 44. A hinge member is provided above each longitudinal row of bottles. Each hinge member 43 includes a flat feeler portion 45 positioned below the pivot 44 which rides along the tops of the bottles and also an upper portion 46 above pivot 44.

Adjacent the upper portions 46 of hinge members 43 is a rod 47 which extends laterally across the conveyor. Rod 47 is made of a conductive material and is supported in insulated mounting 48.

Figure 9:
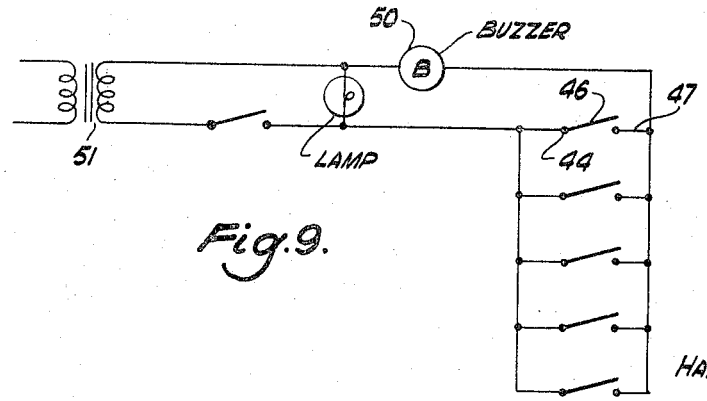
FIGURE 9 is a schematic illustration of the circuit used.

The hinge member upper portions 46 and pivot rod 44 are also made from a conducting material and rod 44 is supported in insulated mounting 49. Rods 44 and 47 are connected to an electrical circuit as shown in FIGURE 9 so that the circuit is completed when a hinge member upper portion 46 contacts rod 47.

Thus, in operation the device is normally as shown in solid lines in FIGURE 7 but when a fallen bottle moves under a hinge member, the hinge member pivots downwardly as shown by broken lines in FIGURE 7 and hinge member upper portion 46 contacts rod 47 to complete the circuit. This either activates the alarm buzzer 50 or activates a mechanism (not shown) for righting the fallen bottle.

Since the mechanism is exposed, it is important for the sake of safety to operate at a low voltage. This can conveniently be done by a 115/24 volt step-down transformer 51 which provides a 24 volt circuit in the detector system.

What we claim as our invention is:

1. A conveyor detector for detecting fallen bottles, comprising in combination:
   (a) a conveyor for carrying a plurality of longitudinal rows of bottles in upright position,
   (b) a support member extending across the conveyor at an elevation substantially above the height of the bottles travelling along said conveyor,
   (c) a series of depending hinge members pivotally attached to said support member as a transverse axis,
   (d) each said depending hinge member including a feeler arm adapted to ride along the mouths of a longitudinal row of bottles travelling forwardly on said conveyor, said feeler arm being of a length sufficient to pass from the mouth of one upright bottle to the mouth of the next following upright bottle in said longitudinal row without pivoting downwardly while pivoting downwardly when it passes over a fallen bottle, and
   (e) switch means adapted to be actuated by each said depending hinge member when it pivots downwardly while passing over a fallen bottle.

2. A detector according to claim 1 wherein each depending hinge member is connected to an electrical power source and an electrical contact is provided in association with each depending hinge member, each said contact and depending hinge member being arranged such that the hinge member contacts the electrical contact and completes a circuit to said switch means when the feeler arm of said hinge member pivots downwardly to pass over a fallen bottle.

3. A detector according to claim 2 wherein current is supplied to the depending hinge members through the support member.

4. A detector according to claim 2 wherein the hinge members and contacts are connected to a low voltage power source.

5. A detector according to claim 1, wherein a light source is provided on one side of said series of depending members and a photoelectric cell on the other side of said members, said light source and photoelectric cell being arranged such that a light beam from said source can be focused on said photoelectric cell and being in such position that the light beam is interrupted by a depending member when a feeler arm passes over a fallen bottle while the beam remains unbroken when the feeler arms pass over the mouths of the upright bottles, and wherein said switch means is adapted to be actuated by said photoelectric cell.

6. A detector according to claim 1, wherein the switch means actuates an alarm.

References Cited

UNITED STATES PATENTS

| | | | |
|---|---|---|---|
| 2,465,215 | 3/1949 | Fergnani | 250—223 |
| 2,617,593 | 11/1952 | Audier et al. | 250—219 X |
| 2,828,917 | 4/1958 | Wheeler et al. | 250—219 X |
| 3,219,829 | 11/1965 | Reist | 250—223 |
| 3,278,023 | 10/1966 | Schneider | 88—14 X |

WALTER STOLWEIN, Primary Examiner.

U.S. Cl. X.R.

198—33